2,746,967
Patented May 22, 1956

2,746,967

DERIVATIVES OF BIS-(N-SUBSTITUTED-3-HYDROXYPIPERIDINIUM) ALKANES

John H. Biel, Milwaukee, Wis., assignor to Lakeside Laboratories, Inc., a corporation of Wisconsin No Drawing. Application November 2, 1953, Serial No. 389,849

6 Claims. (Cl. 260—294.7)

This invention relates to the derivatives of bis-(N-substituted-3-hydroxypiperidinium) alkanes and more particularly the salts thereof.

I have discovered and synthesized a group of new and superior therapeutic compounds, particularly useful in producing ganglionic blockade and hypotension. The new compounds of this invention may be designated generally the derivatives of bis-(N-substituted-3-hydroxypiperidinium) alkanes, having the following structural formula:

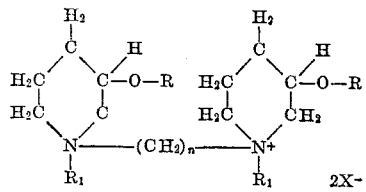

wherein $n$ is an integer of from about 2 to 10; R is hydrogen, lower alkyl, monocyclic aryl or an aralkyl radical in which the aryl group is monocyclic and the alkyl group of the aralkyl radical is a lower alkyl; $R_1$ is a lower alkyl or an aralkyl radical in which the aryl group is monocyclic and the alkyl group of the aralkyl radical is a lower alkyl; and X is the negative ion of a non-toxic acid. By a non-toxic acid I mean one that is non-toxic when taken in therapeutic dosages.

The compounds of this invention preferably are in the form of quaternary ammonium salts which are generally soluble in water. Examples of the salts which may be prepared include halide, sulfate, phosphate, tartrate, benzoate, acetate, citrate, cinnamate, mandelate, maleate, succinate, and the like.

Examples of the new compounds and their preparation are as follows:

*Example*

1,5-bis(N-methyl-3-hydroxypiperidinium)-pentane dibromide, having the following structural formula:

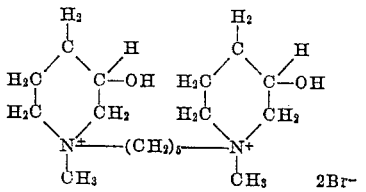

A mixture containing 11.5 g. (0.05 mole) of pentamethylene dibromide and 11.5 g. (0.10 mole) N-methyl-3-hydroxypiperidine in 50 cc. isopropyl alcohol was allowed to stand at 30° for two weeks. The crystalline product was collected by filtration and purified by recrystallization from absolute ethyl alcohol, yield 13 g. (56%); M. P. 235–238° C.

Analysis calculated for $C_{17}H_{32}Br_2N_2O_2$: Br, 35.10; N, 6.14. Found: Br, 34.89; N, 6.14.

Other examples of the new compounds are as follows:

A. 1,10 - bis - (N - ethyl - 3 - hydroxypiperidinium) - decane dibromide:

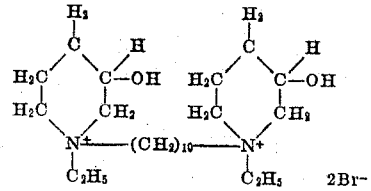

B. 1,6 - bis - (N - n - hexyl - 3 - methoxypiperidinium)-hexane dibromide:

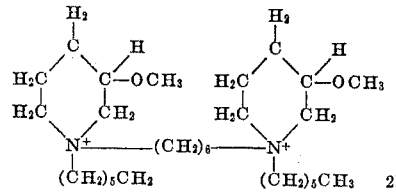

C. 1,5 - bis - (N - benzyl - 3 - phenoxypiperidinium) - pentane dibromide:

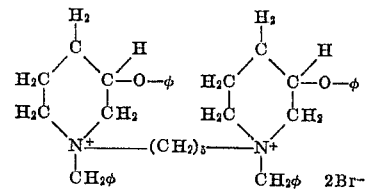

D. 1,6 - bis - (N - methyl - 3 - benzhydryloxypiperidinium)-hexane dibromide:

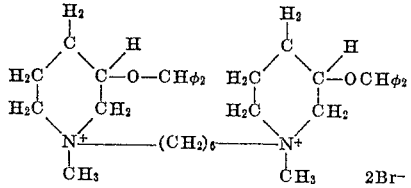

E. 1,2 - bis - (N - methyl - 3 - hydroxypiperidinium) - ethane dibromide:

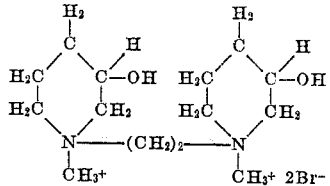

The foregoing description is given for clearness of understanding only and no unnecessary limitations are to be understood therefrom, for modifications will be obvious to those skilled in the art.

I claim:

1. A member of the group consisting of compounds of the formula:

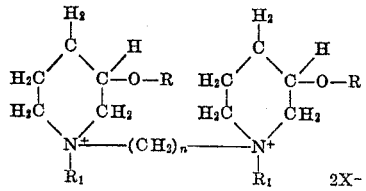

wherein $n$ is an integer from 2 to 10; R is a member of the class consisting of hydrogen, lower alkyl, monocyclic aryl, and aralkyl radicals in which the aryl group is monocyclic and the alkyl group of the aralkyl radical is a lower alkyl; $R_1$ is a member of the class consisting of lower alkyl and aralkyl radicals in which the aryl group is monocyclic and the alkyl group of the aralkyl radical is a lower alkyl; and X is the negative ion of a non-toxic acid.

2. The composition of claim 1 wherein R is hydrogen, $R_1$ is methyl, $n$ is 5, and X is Br.

3. The composition of claim 1 wherein R is hydrogen, $R_1$ is ethyl, $n$ is 10, and X is Br.

4. The composition of claim 1 wherein R is methyl, $R_1$ is n-hexyl, $n$ is 6, and X is Br.

5. The composition of claim 1 wherein R is phenyl, $R_1$ is benzyl, $n$ is 5 and X is Br.

6. The composition of claim 1, wherein R is benzhydryl, $R_1$ is methyl, $n$ is 6, and X is Br.

References Cited in the file of this patent
UNITED STATES PATENTS

| | | |
|---|---|---|
| 2,477,937 | Paul et al. | Aug. 2, 1949 |
| 2,533,003 | Feldkamp | Dec. 5, 1950 |

OTHER REFERENCES

Paul: Compt. rend (Fr. Acad. Sci.), vol. 221, No. 15, pp. 412–4 (1945).

Paul: Compt. rend (Fr. Acad. Sci.), vol. 221, pp. 560–2 (1945).

Chen et al.: Chem. Abstracts, vol. 46, col. 6263 (1952).